(12) United States Patent
Eo

(10) Patent No.: US 8,481,188 B2
(45) Date of Patent: Jul. 9, 2013

(54) RECHARGEABLE BATTERY

(75) Inventor: Soo-Mi Eo, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 376 days.

(21) Appl. No.: 13/013,761

(22) Filed: Jan. 25, 2011

(65) Prior Publication Data

US 2011/0256436 A1 Oct. 20, 2011

(30) Foreign Application Priority Data

Apr. 19, 2010 (KR) .................. 10-2010-0036088

(51) Int. Cl.
*H01M 10/50* (2006.01)
*H01M 10/36* (2010.01)

(52) U.S. Cl.
USPC .................. 429/94; 429/120; 429/185

(58) Field of Classification Search
None
See application file for complete search history.

(56) References Cited

U.S. PATENT DOCUMENTS

| | | | | |
|---|---|---|---|---|
| 8,329,328 | B2* | 12/2012 | Mitsuda et al. | 429/94 |
| 2009/0081530 | A1* | 3/2009 | Hashimoto et al. | 429/56 |
| 2010/0330408 | A1 | 12/2010 | Yoon et al. | |
| 2011/0008665 | A1 | 1/2011 | Yoon et al. | |
| 2011/0008666 | A1* | 1/2011 | Yoon et al. | 429/120 |
| 2011/0045333 | A1 | 2/2011 | Kim et al. | |

FOREIGN PATENT DOCUMENTS

| | | |
|---|---|---|
| JP | 2005-056655 | 3/2005 |
| KR | 10-2006-0111841 | 10/2006 |
| KR | 10-2008-0042965 A | 5/2008 |
| KR | 10-2009-0047924 A | 5/2009 |
| KR | 10-2009-0047927 A | 5/2009 |
| KR | 10-2009-0052505 A | 5/2009 |
| KR | 10-2011-0018810 A | 2/2011 |

* cited by examiner

*Primary Examiner* — John S Maples
(74) *Attorney, Agent, or Firm* — Christie, Parker & Hale, LLP

(57) ABSTRACT

A rechargeable battery including an electrode assembly including a positive electrode, a negative electrode, and a separator between the positive electrode and the negative electrode; a case housing the electrode assembly; a heat dissipating member including a heat collecting portion inserted in the electrode assembly and a heat dissipating portion protruding outside of the case; and a sealing member between the heat dissipating member and the case, the sealing member including a first polymer layer and a second polymer layer having a melting point that is lower than a melting point of the first polymer layer.

20 Claims, 11 Drawing Sheets

RECHARGEABLE BATTERY

CROSS-REFERENCE TO RELATED APPLICATION

This application claims priority to and the benefit of Korean Patent Application No. 10-2010-0036088 filed in the Korean Intellectual Property Office on Apr. 19, 2010, the entire content of which is incorporated herein by reference.

BACKGROUND

1. Field

Aspects of embodiments of the present invention relate to a rechargeable battery, and more particularly, to a rechargeable battery having a sealing structure of a heat dissipating member that is installed within an electrode assembly.

2. Description of the Related Art

A rechargeable battery can be recharged and discharged, unlike a primary battery that cannot be recharged. A low-capacity rechargeable battery is commonly used for a small portable electronic device, such as a mobile phone, a laptop computer, or a camcorder, and a large-capacity rechargeable battery is widely used as a power source for driving a motor, such as for a hybrid vehicle, and a battery for storing power.

A large-capacity, high-power rechargeable battery using high energy density of a non-aqueous electrolyte has been developed, and such a large-capacity, high-power rechargeable battery is formed with a high-output battery module in which a plurality of rechargeable batteries for driving a device requiring a large amount of electric power, such as a motor of an electric vehicle, are coupled in series.

Further, such a rechargeable battery can be formed in a cylindrical shape, a quadrangular shape, a pouch type, etc.

While the rechargeable battery is charged and discharged, much heat is generated within the rechargeable battery, and it is very important to effectively emit such heat. When the internal temperature of the rechargeable battery is high, an abnormal reaction occurs and thus the life-span of the rechargeable battery is deteriorated, and when the temperature thereof continues to rise, the rechargeable battery may ignite or explode.

Further, it is very important to stably seal a case of the rechargeable battery in order to prevent leakage of an electrolyte solution, and in a process of heat pressing a case of a pouch type rechargeable battery, as a melted polymer is excessively deformed, when a polymer layer is non-uniformly formed, a problem that sealing is not appropriately performed occurs. Where sealing is not appropriately performed, when the electrolyte solution leaks, the rechargeable battery may be short-circuited or ignited due to the leaked electrolyte solution.

Further, while the electrode assembly repeats charge and discharge, the volume thereof may expand or it may be deformed, and when the shape of the electrode assembly is deformed, a problem of charge and discharge efficiency being deteriorated occurs.

The above information disclosed in this Background section is only for enhancement of understanding of the background of the described technology and therefore it may contain information that does not form the prior art that is already known in this country to a person of ordinary skill in the art.

SUMMARY

According to aspects of embodiments of the present invention, a rechargeable battery has improved safety.

According to an exemplary embodiment of the present invention, a rechargeable battery includes: an electrode assembly including a positive electrode, a negative electrode, and a separator between the positive electrode and the negative electrode; a case housing the electrode assembly; a heat dissipating member including a heat collecting portion inserted in the electrode assembly and a heat dissipating portion protruding outside of the case; and a sealing member between the heat dissipating member and the case, the sealing member including a first polymer layer and a second polymer layer having a melting point that is lower than a melting point of the first polymer layer.

In one embodiment, the electrode assembly has a spiral-wound structure, and the heat dissipating member is inserted in a center of the electrode assembly.

In one embodiment, the heat dissipating member has a hole formed in a portion contacting the sealing member. A portion of the sealing member may be in the hole.

In one embodiment, the second polymer layer includes polypropylene.

The second polymer layer may include a first sealing layer including polypropylene and a second sealing layer including cast polypropylene.

The first polymer layer and the second polymer layer may be stacked.

In one embodiment, the sealing member further includes a third polymer layer having a melting point that is lower than the melting point of the first polymer layer, and the first polymer layer is disposed between the second polymer layer and the third polymer layer. The third polymer layer may include a third sealing layer including polypropylene and a fourth sealing layer including cast polypropylene. The fourth sealing layer may be between the third sealing layer and the first polymer layer.

The first polymer layer may include an imide-based resin. The first polymer layer may include a material selected from the group consisting of polyimide, polyamideimide, polyetherimide, and polybismaleimide.

The melting point of the first polymer layer may be at least 20° C. higher than the melting point of the second polymer layer. In one embodiment, the sealing member is hot pressed.

In one embodiment, the heat dissipating member includes a metal plate.

The heat dissipating member may further include an interception layer covering a surface of the heat collecting portion.

In one embodiment, the rechargeable battery further includes a terminal protruding outside of the case in a first direction, and the heat dissipating portion is protruding outside of the case in a different direction than the first direction.

In one embodiment, the heat dissipating portion is a first heat dissipating portion, and the heat dissipating member further includes a second heat dissipating portion protruding outside of the case in a direction opposite a direction in which the first heat dissipating portion is protruding outside of the case. The heat dissipating member may further include a third heat dissipating portion protruding outside of the case in a direction intersecting the directions in which the first and second heat dissipating portions are protruding outside of the case.

In one embodiment, the heat dissipating portion is connected to and protruding outside of the case along three surfaces of the case.

According to an aspect of embodiments of the present invention, a sealing portion that seals between a case and a heat dissipating member includes a first polymer layer and a second polymer layer having different melting points, and sealing between the case and the heat dissipating member can be stably performed.

BRIEF DESCRIPTION OF THE DRAWINGS

The above and other features and advantages of embodiments of the present invention will become more apparent to those of ordinary skill in the art by describing in detail some exemplary embodiments of the present invention with reference to the attached drawings.

Figure 1:
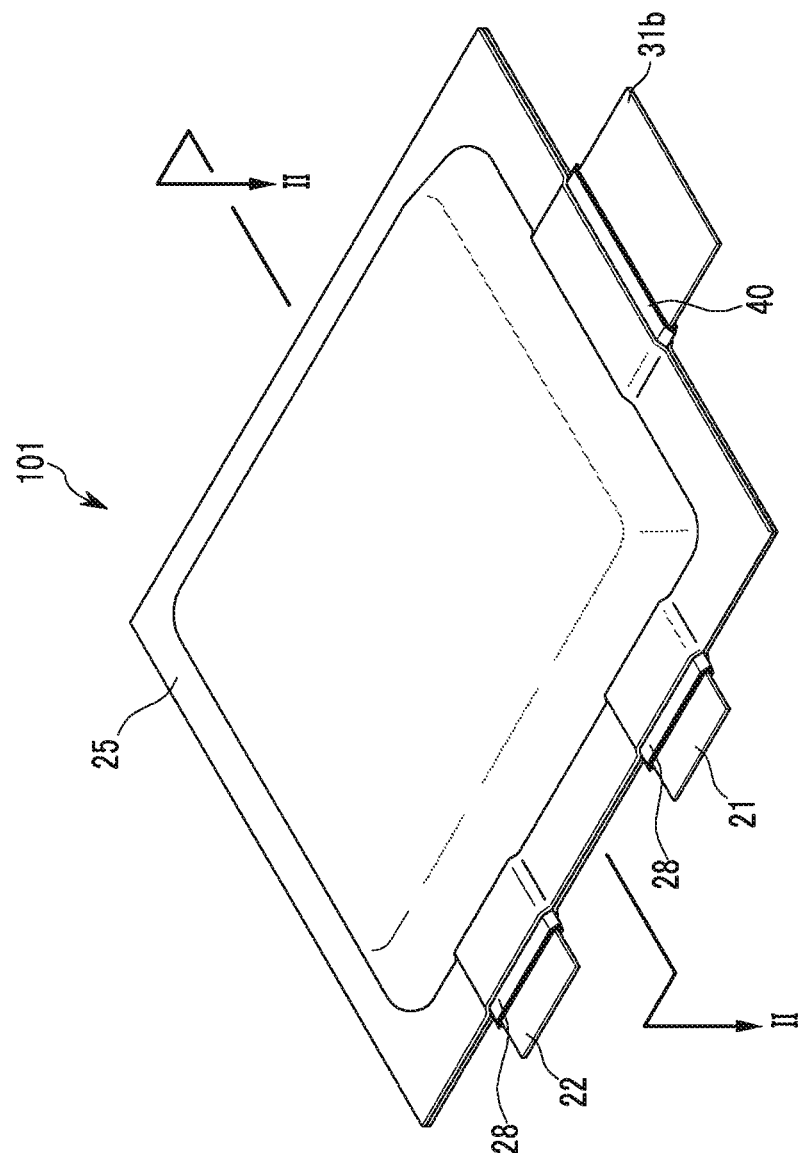
FIG. 1 is a perspective view of a rechargeable battery according to an exemplary embodiment of the present invention.

| Description of Reference Numerals Indicating Some Elements in the Drawings | |
|---|---|
| 101, 102, 103, 104, 105, 106, 107: rechargeable battery | |
| 10, 15: electrode assembly | |
| 11: positive electrode | 11a: positive uncoated portion |
| 12: negative electrode | 12a: negative uncoated portion |
| 13: separator | 21: positive terminal |
| 22: negative terminal | 23: positive current collecting tap |
| 24: negative current collecting tap | 25: case |
| 30, 70, 80, 90, 130, 230: heat dissipating member | |
| 31, 71, 81, 91, 131, 231: metal plate | |
| 31a, 71a, 81a, 91a, 131a, 231a: heat collecting portion | |
| 31b, 91b, 131b, 231b: heat dissipating portion | |
| 71b, 81b: first heat dissipating portion | |
| 71c, 81c: second heat dissipating portion | 81d: third heat dissipating portion |
| 72, 82, 92, 232: interception layer | 74, 84, 94, 134, 234: hole |
| 40, 50: sealing member | 41, 51: first polymer layer |
| 42, 52: second polymer layer | 43, 53: third polymer layer |
| 54: first sealing layer | 55: second sealing layer |
| 56: third sealing layer | 57: fourth sealing layer |

DETAILED DESCRIPTION

In the following detailed description, some exemplary embodiments of the present invention are shown and described, by way of illustration. As those skilled in the art would realize, the described exemplary embodiments may be modified in various ways without departing from the spirit or scope of the present invention. Rather, these exemplary embodiments are provided by way of example for understanding of the invention and to convey the scope of the invention to those skilled in the art. Like reference numerals designate like elements throughout the specification and the drawings.

Figure 2:
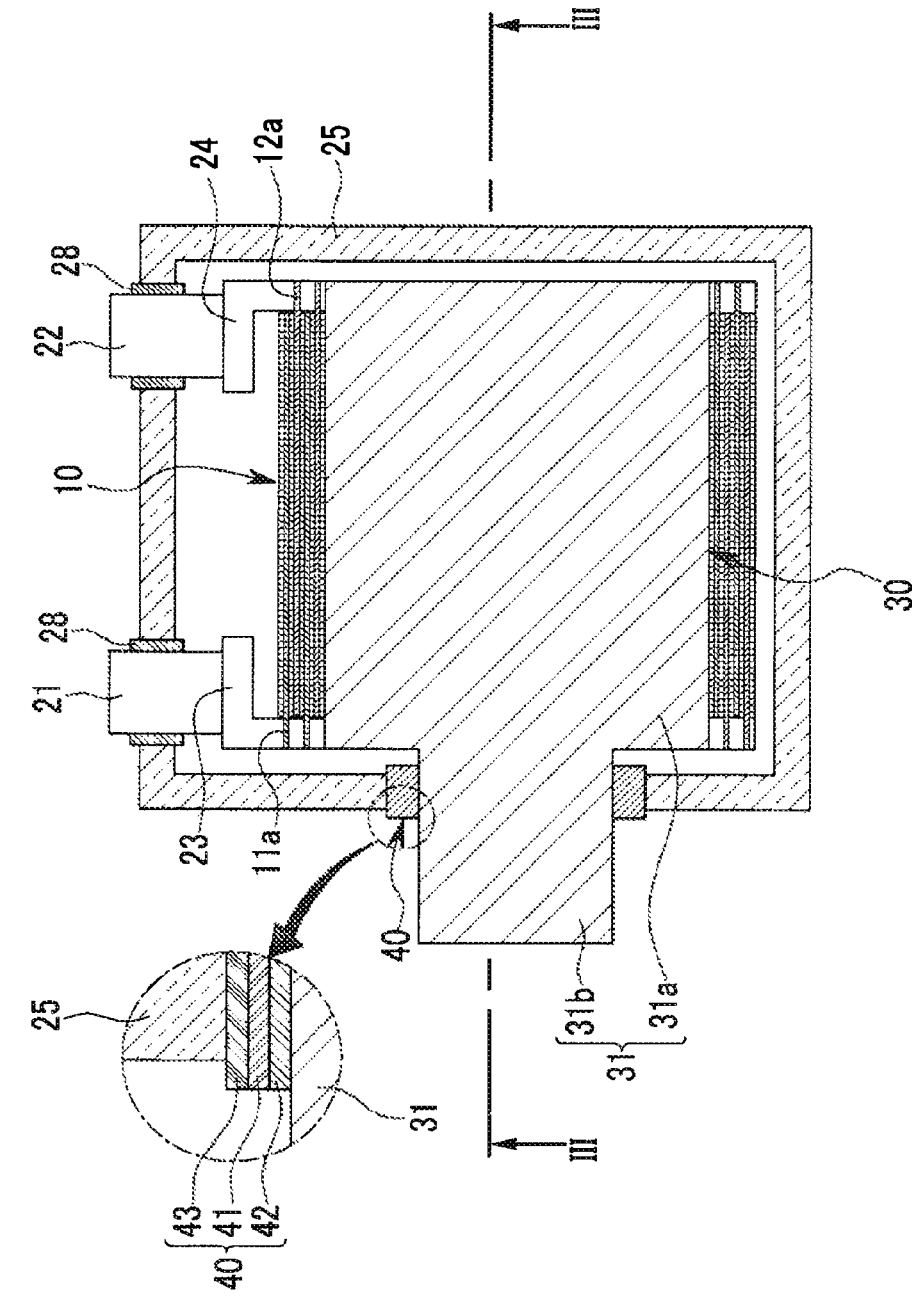
FIG. 2 is a cross-sectional view of the rechargeable battery of FIG. 1 taken along line II-II.

FIG. 1 is a perspective view of a rechargeable battery according to an exemplary embodiment of the present invention, and FIG. 2 is a cross-sectional view taken along line II-II of FIG. 1.

Referring to FIGS. 1 and 2, a rechargeable battery 101 includes an electrode assembly 10 that performs charge and discharge, and a case 25 that houses the electrode assembly 10.

The case 25 forms an exterior of the rechargeable battery 101 and provides a space in which the electrode assembly 10 is contained. The case 25 is formed in a pouch type that is formed with a film.

In one embodiment, a positive terminal 21 and a negative terminal 22 are electrically connected to the electrode assembly 10, and the positive terminal 21 and the negative terminal 22 are protruded to the outside of the case 25.

In one embodiment, the positive terminal 21 is electrically connected to a positive uncoated portion 11a of the electrode assembly 10 through a positive current collecting tab 23, and the negative terminal 22 is electrically connected to a negative uncoated portion 12a of the electrode assembly 10 through a negative current collecting tab 24. The positive terminal 21 and the negative terminal 22 are protruded to the outside of the case 25, and an insulation layer 28 for insulating and sealing is installed between the positive terminal 21 and the case 25, and between the negative terminal 22 and the case 25. The positive terminal 21 and the negative terminal 22, according to one exemplary embodiment, are protruded in the same direction from the case 25; however, the present invention is not limited thereto and, in another embodiment, the positive terminal 21 and the negative terminal 22 may be protruded in opposite directions.

Figure 3:
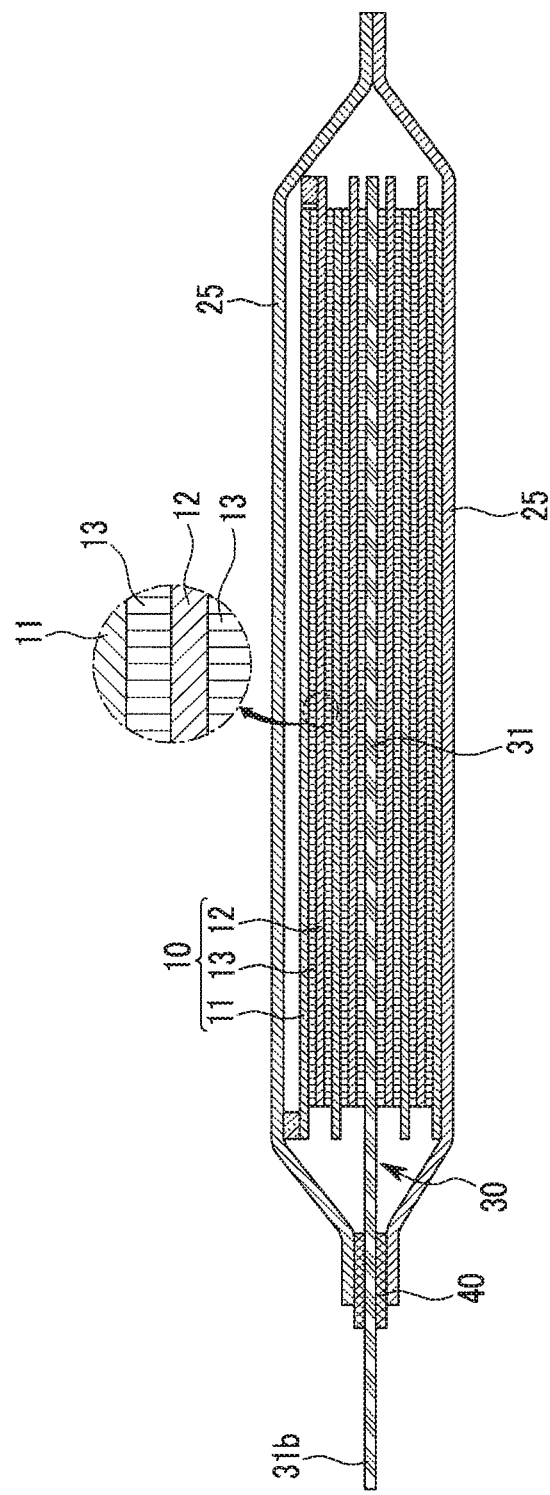
FIG. 3 is a cross-sectional view of the rechargeable battery of FIG. 1 taken along line III-III of FIG. 2.

As shown in FIGS. 2 and 3, the electrode assembly 10 includes a positive electrode 11, a negative electrode 12, and a separator 13 that is disposed between the positive electrode 11 and the negative electrode 12. The electrode assembly 10, in one embodiment, is formed in a structure in which the positive electrode 11 and the negative electrode 12 are formed in a belt shape and are spirally wound with the separator 13 interposed therebetween.

The positive uncoated portion 11a, at which a positive electrode active material is not coated, is formed at one side in the width direction of the positive electrode 11, and the negative uncoated portion 12a, at which a negative electrode active material is not coated, is formed at one side in the width direction of the negative electrode 12. In one embodiment, as shown in FIG. 2, the positive uncoated portion 11a and the negative uncoated portion 12a are formed at opposite sides of the electrode assembly 10.

A heat dissipating member 30 that emits heat generated in the electrode assembly 10 to the outside is inserted into the electrode assembly 10, such as at the center of the electrode assembly 10. In one embodiment, the heat dissipating member 30 is formed of a metal plate 31, and the metal plate 31 includes a heat collecting portion 31a that is positioned within the case 25 and that is formed in an approximately quadrangular plate structure and a heat dissipating portion 31b that is protruded from the heat collecting portion 31a and exposed to the outside of the case 25.

The heat dissipating portion 31b, in one embodiment, is protruded outside of the case 25 in a different direction from the protruding direction of the terminals 21 and 22, and the heat dissipating portion 31b according to one exemplary embodiment is protruded from a side surface intersecting a side surface of the case 25 in which the terminals 21 and 22 are protruded. When the heat dissipating portion 31b is protruded in a different direction from a protruding direction of the terminals 21 and 22, the heat dissipating portion 31b can easily emit heat without interference of the terminals 21 and 22.

A sealing member 40 for sealing is installed between the case 25 and the heat dissipating member 30. The sealing member 40 is formed in a multi-layered structure, and includes a first polymer layer 41, a second polymer layer 42, and a third polymer layer 43 having a lower melting point than the first polymer layer 41. In one embodiment, the first polymer layer 41 is disposed between the second polymer layer 42 and the third polymer layer 43.

The first polymer layer 41, in one embodiment, has a melting point that is at least 20° C. higher than a melting point of the second polymer layer 42 and a melting point of the third polymer layer 43. In one embodiment, a melting point of the first polymer layer is 20° C. to 300° C. higher than a melting point of the second polymer layer. As used herein, the melting point refers to a temperature at which heat decomposition starts.

If the melting point difference between the first polymer layer 41 and the second and third polymer layers 42 and 43 is less than 20° C., in a thermal adhesion process, the first polymer layer 41 is melted together and thus a problem that the sealing member 40 is not supported and is deformed occurs. When the sealing member 40 is deformed, the thickness of the sealing member 40 is not uniform, and thus the sealing performance between the heat dissipating member 30 and the case 25 is deteriorated.

In one embodiment, the second polymer layer 42 and the third polymer layer 43 are formed of a polypropylene layer or a cast polypropylene layer. Polypropylene has a melting point of about 160° C. In one exemplary embodiment, the second polymer layer 42 and the third polymer layer 43 are made of the same material, but the present invention is not limited thereto, and when the second polymer layer 42 and the third polymer layer 43 have a lower melting point than the first polymer layer 41, the second polymer layer 42 and the third polymer layer 43 may be made of other materials having different melting points.

The first polymer layer 41, in one embodiment, is made of a thermal resistance polymer material having a melting point of 180° C. or more. In one exemplary embodiment, the first polymer layer 41 may be made of an imide-based resin, such as polyimide, polyamideimide, polyetherimide, or polybismaleimide. A heat decomposition start temperature of a polyimide is generally about 450° C., and thus the first polymer layer 41 has very strong thermal resistance, thereby capable of enduring high heat, compared with the second polymer layer 42 and the third polymer layer 43.

The sealing member 40 is connected along the circumference of the heat dissipating portion 31b and is heat pressed to be attached to the heat dissipating member 30 and the case 25. When the sealing member 40 is heat pressed, the plurality of layers are fused to seal the case 25.

Particularly, because the first polymer layer 41 is positioned between the second polymer layer 42 and the third polymer layer 43, the second polymer layer 42 and the third polymer layer 43 having a relatively low melting point are melted and thus the sealing property is improved, and because the first polymer layer 41 supports pressure in an initial stage, the form, or shape, of the sealing member 40 can be sustained and the sealing member 40 is stably pressed to closely contact the case 25 and the heat dissipating member 30.

In an exemplary embodiment, when the heat dissipating member 30 having the heat collecting portion 31a and the heat dissipating portion 31b is installed, the shape of the electrode assembly 10 can be stably sustained, and heat that is generated within the electrode assembly 10 can be collected in the heat collecting portion 31a and can be emitted from the heat dissipating portion 31b that, in one embodiment, is integrally formed with the heat collecting portion 31a, to the outside of the case 25. Accordingly, by thus emitting heat generated within the rechargeable battery 101, the temperature of the rechargeable battery 101 is prevented or substantially prevented from excessively rising and, thus, safety of the rechargeable battery 101 is improved.

Figure 4:
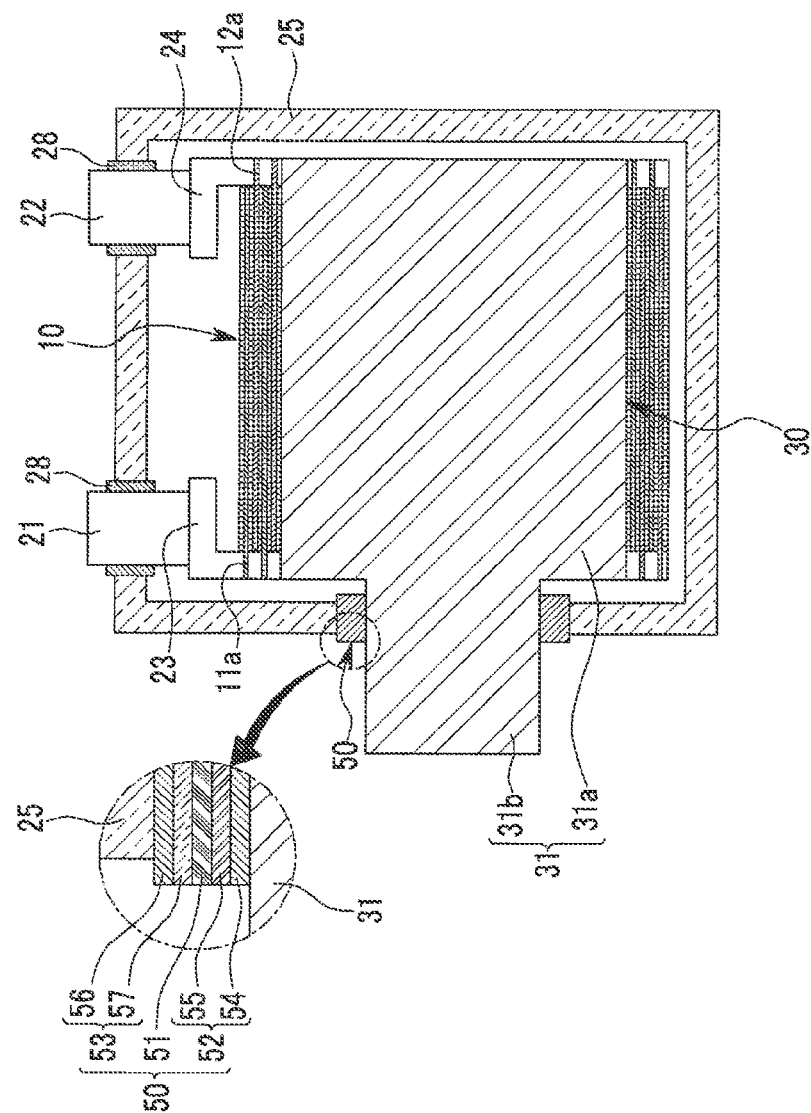
FIG. 4 is a cross-sectional view of a rechargeable battery according to another exemplary embodiment of the present invention.

FIG. 4 is a cross-sectional view of a rechargeable battery according to another exemplary embodiment of the present invention.

Referring to FIG. 4, a rechargeable battery 102 according to one exemplary embodiment of the present invention is formed having the same or substantially the same structure as the rechargeable battery 101 described above, except for the structure of a polymer layer, and therefore a detailed description of the other same or similar components thereof will be omitted.

In the rechargeable battery 102, a sealing member 50 for sealing is installed between the case 25 and the heat dissipating member 30. The sealing member 50 is formed in a multi-layered structure and includes a first polymer layer 51, a second polymer layer 52 that is stacked to contact one surface of the first polymer layer 51 and that has a lower melting point than the first polymer layer 51, and a third polymer layer 53 that is stacked to contact an opposite surface of the first polymer layer 51 and that has a lower melting point than the first polymer layer 51.

The second polymer layer 52 includes a first sealing layer 54 that is made of polypropylene and a second sealing layer 55 that is made of cast polypropylene. Further, the third polymer layer 53 includes a third sealing layer 56 that is made of polypropylene and a fourth sealing layer 57 that is made of cast polypropylene.

The first sealing layer 54 is positioned between the second sealing layer 55 and the metal plate 31, and the second sealing layer 55 is positioned between the first sealing layer 54 and the first polymer layer 51. Further, the third sealing layer 56 is positioned between the fourth sealing layer 57 and the case 25, and the fourth sealing layer 57 is positioned between the third sealing layer 56 and the first polymer layer 51.

The first sealing layer 54, the second sealing layer 55, the first polymer layer 51, the fourth sealing layer 57, and the third sealing layer 56 are sequentially stacked on the metal plate 31, and these layers are heat pressed to form the sealing member 50.

In one embodiment, a melting point of the first polymer layer 51 is at least 20° C. higher than a melting point of the second polymer layer 52 and a melting point of the third polymer layer 53. In one embodiment, a melting point of the first polymer layer is 20° C. to 300° C. higher than a melting point of the secondary polymer layer.

If the melting point difference between the first polymer layer 51 and the second polymer layer 52 and the third polymer layer 53 is less than 20° C., in a thermal adhesion process, the first polymer layer 51 is melted together and a problem occurs of the form thereof being deformed. When the first polymer layer 51 is deformed, the thickness of the sealing member 50 is not uniform and, thus, sealing performance between the heat dissipating member 30 and the case 25 is deteriorated.

In one embodiment, polypropylene constituting the second polymer layer 52 and the third polymer layer 53 has a melting point of about 160° C., and the first polymer layer 51 is made of a thermal resistance polymer material having a melting point of 180° C. or higher.

In one exemplary embodiment, the first polymer layer 51 is made of an imide-based resin, such as polyimide, polyamideimide, polyetherimide, or polybismaleimide. The heat decomposition start temperature of a polyimide is generally about 450° C., and thus the first polymer layer 51 has a strong thermal resistance and is capable of enduring high heat, compared with the second polymer layer 52 and the third polymer layer 53.

The sealing member 50 is connected along the circumference of the heat dissipating portion 31b and is heat pressed to be attached to the heat dissipating member 30 and the case 25. When the sealing member 50 is heat pressed, a plurality of layers are fused to seal the case 25. Particularly, because the first sealing layer 54, the third sealing layer 56, the second sealing layer 55, and the fourth sealing layer 57 are formed at the outside of the first polymer layer 51, the second polymer layer 52 and the third polymer layer 53 having a relatively low melting point are melted and the sealing property is improved, and because the first polymer layer 51 supports pressure in an initial stage, the form of the sealing member 50 can be sustained and the sealing member 50 may be stably pressed to closely contact the case 25 and the heat dissipating member 30.

Figure 5:
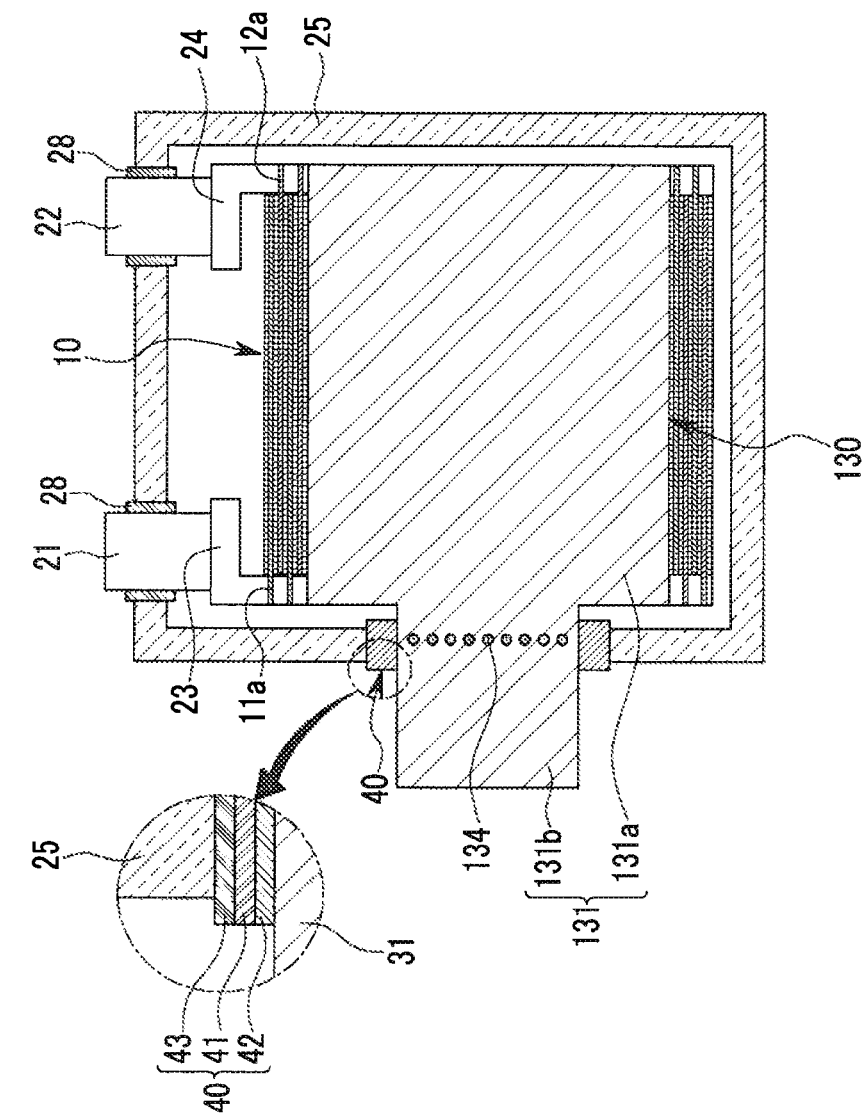
FIG. 5 is a cross-sectional view of a rechargeable battery according to another exemplary embodiment of the present invention.

FIG. 5 is a cross-sectional view of a rechargeable battery according to another exemplary embodiment of the present invention. Referring to FIG. 5, a rechargeable battery 103 according to one exemplary embodiment of the present invention is formed having the same or substantially the same structure as that of the rechargeable battery 101 described above, except for the structure of a heat dissipating member 130, and therefore a detailed description of the other same or similar components thereof will be omitted.

The heat dissipating member 130 according to an exemplary embodiment is inserted into the electrode assembly 10, and has a metal plate 131 that is protruded to the outside of the case 25. The metal plate 131 includes a heat collecting portion 131a that is positioned within the case 25 and that is formed as an approximately quadrangular plate structure, and a heat dissipating portion 131b that is protruded from the heat collecting portion 131a and exposed to the outside of the case 25.

Further, in the heat dissipating portion 131b, a plurality of holes 134 are formed in a portion contacting the sealing member 40, and the sealing member 40 is inserted into the holes 134. The plurality of holes 134 are separated in one direction in a portion in which the sealing member 40 is installed. In one embodiment, each of the holes 134 is formed having a circular shape, but the shape of the holes 134 is not limited thereto and, in other embodiments, may be formed in various shapes or combinations of shapes, such as triangular or quadrangular shapes.

Due to the holes 134 and the sealing member 40 being inserted therein, the heat dissipating portion 131b is configured to be fixed by the sealing member 40 to prevent or substantially prevent the heat dissipating member 130 from moving. Because the heat dissipating portion 131b is exposed to the outside of the case 25, an external impact or vibration may be transferred to the heat dissipating portion 131b. Further, if the heat dissipating portion 131b were to move due to an external impact or vibration, a gap might occur between the heat dissipating portion 131b and the sealing member 40 and the problem of sealing performance being deteriorated could occur. However, in the described exemplary embodiment of the present invention, when forming the hole 134 in the heat dissipating portion 131b and inserting the sealing member 40 into the hole 134, the sealing member 40 and the heat dissipating portion 131b are integrally fixed and, thus, the problem of a gap occurring between the heat dissipating portion 131b and the sealing member 40, such as due to external impact or vibration, is prevented or substantially prevented.

Figure 6:
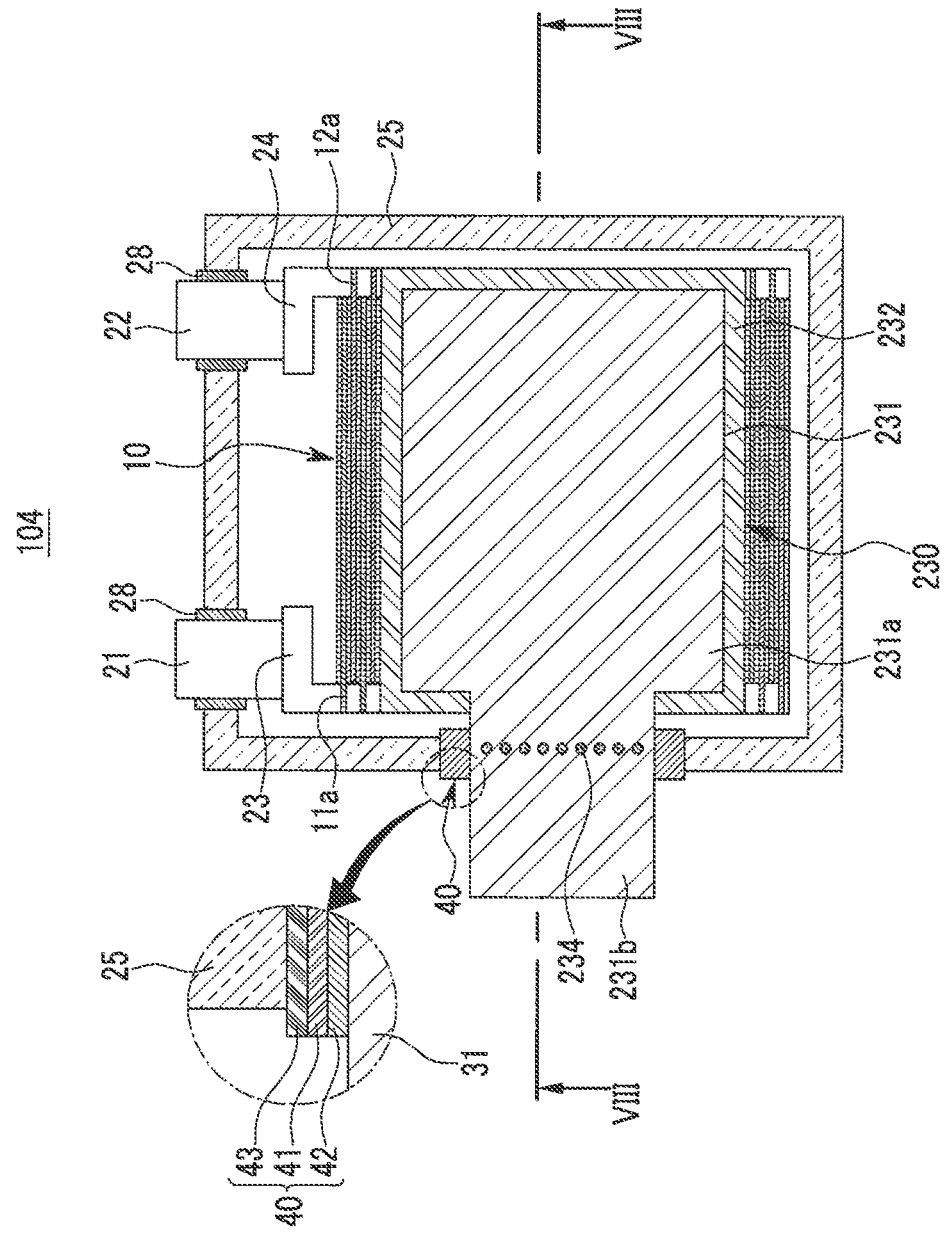
FIG. 6 is a cross-sectional view of a rechargeable battery according to another exemplary embodiment of the present invention.
Figure 7:
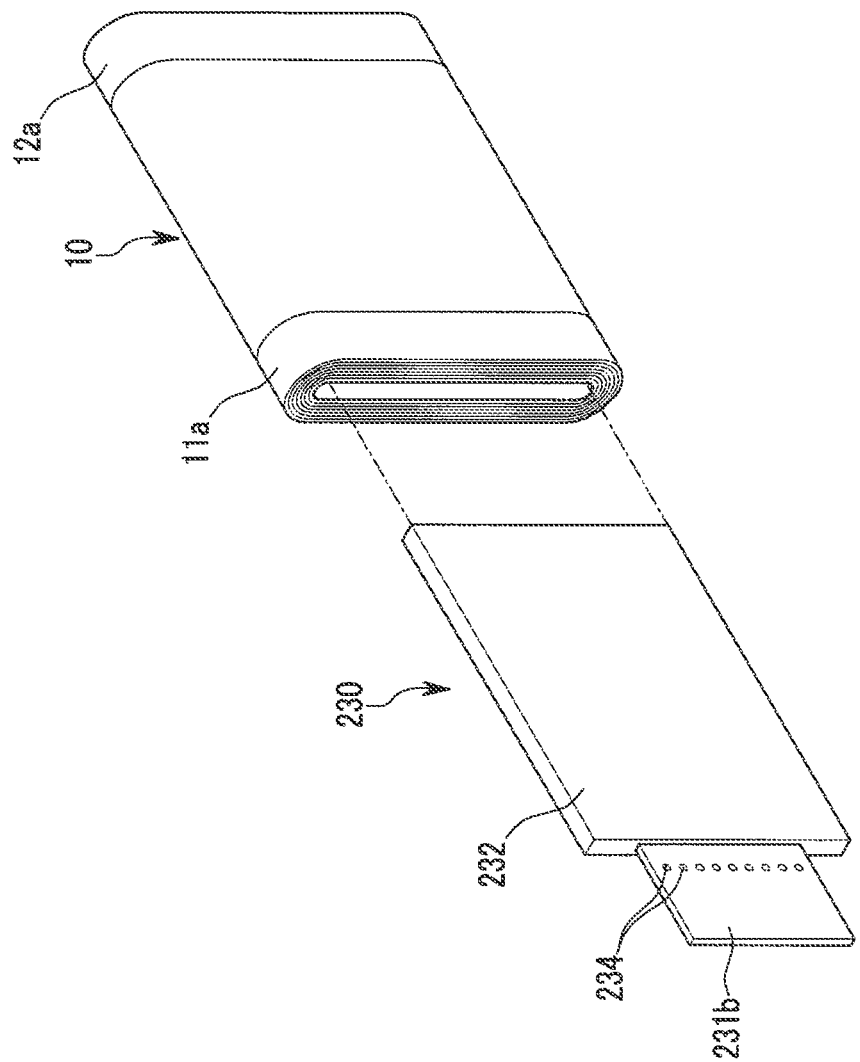
FIG. 7 is an exploded perspective view of an electrode assembly and a heat dissipating member of the rechargeable battery of FIG. 6.
Figure 8:
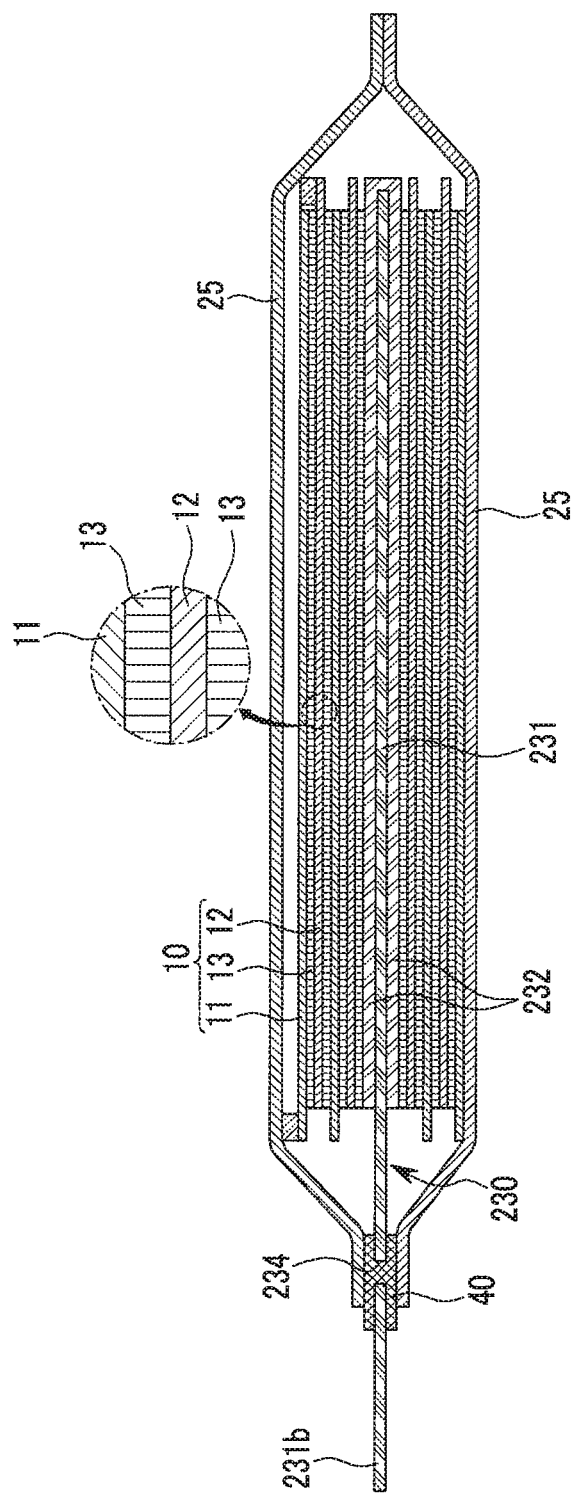
FIG. 8 is a cross-sectional view of the rechargeable battery of FIG. 6 taken along line VIII-VIII.

FIG. 6 is a cross-sectional view of a rechargeable battery according to another exemplary embodiment of the present invention, FIG. 7 is an exploded perspective view illustrating an electrode assembly and a heat dissipating member of the rechargeable battery of FIG. 6, and FIG. 8 is a cross-sectional view of the rechargeable battery of FIG. 6, taken along line VIII-VIII.

With reference to FIGS. 6-8, a rechargeable battery 104 according to an exemplary embodiment of the present invention has the same or substantially the same structure as that of the rechargeable battery 101, except for the structure of a heat dissipating member 230, and therefore a detailed description of the other same or similar components thereof will be omitted.

The heat dissipating member 230 according to one exemplary embodiment includes a metal plate 231 that is inserted into the electrode assembly 10 and is protruded to the outside of the case 25, and an interception layer 232 that encloses the metal plate 231 and is formed of a polymer.

The electrode assembly 10, in one embodiment, is formed by winding in a state where a separator is interposed between a positive electrode and a negative electrode, as described above with respect to the electrode assembly 10 of the rechargeable battery 101. In one embodiment, the metal plate 231 includes a heat collecting portion 231a that is positioned within the case 25 and that is formed in an approximately quadrangular plate structure, and a heat dissipating portion 231b that is protruded from the heat collecting portion 231a and exposed to the outside of the case 25.

The interception layer 232 covers the heat collecting portion 231a, and the interception layer 232 is not formed in the heat dissipating portion 231b. The interception layer 232 is formed of a thin film in order to easily transfer heat to the heat collecting portion 231a. The heat dissipating portion 231b, in one embodiment, is protruded in a different direction from a protruding direction of the terminals 21 and 22. Further, in one embodiment, in the heat dissipating portion 231b, a plurality of holes 234 are formed in a portion contacting the sealing member 40, and the sealing member 40 is inserted into the holes 234.

In the rechargeable battery 104, when the heat dissipating member 230 having the heat collecting portion 231a and the heat dissipating portion 231b is installed, the shape of the electrode assembly 10 can be stably sustained, and heat that is generated within the electrode assembly 10 is collected in the heat collecting portion 231a and emitted from the heat dissipating portion 231b that, in one embodiment, is integrally formed with the heat collecting portion 231a to the outside. Accordingly, by easily emitting heat that is generated within the rechargeable battery 104, the temperature of the rechargeable battery 104 is prevented or substantially prevented from excessively rising and, thus, safety of the rechargeable battery 104 is improved.

Further, because the heat dissipating member 230 of the rechargeable battery 104 includes the interception layer 232 that covers the metal plate 231, an electrolyte solution and the metal plate 231 can be prevented or substantially prevented from reacting.

While repeating charge and discharge, when the electrode assembly 10 is deformed by expanding, a gap between the electrodes may be extended. If the gap between the electrodes is extended, the moving distance between ions and electrons is extended and thus charge and discharge efficiency is reduced. However, according to exemplary embodiments described herein, because the heat dissipating member 230 supports the form of the electrode assembly 10, the electrode assembly 10 can be prevented or substantially prevented from being deformed.

Figure 9:
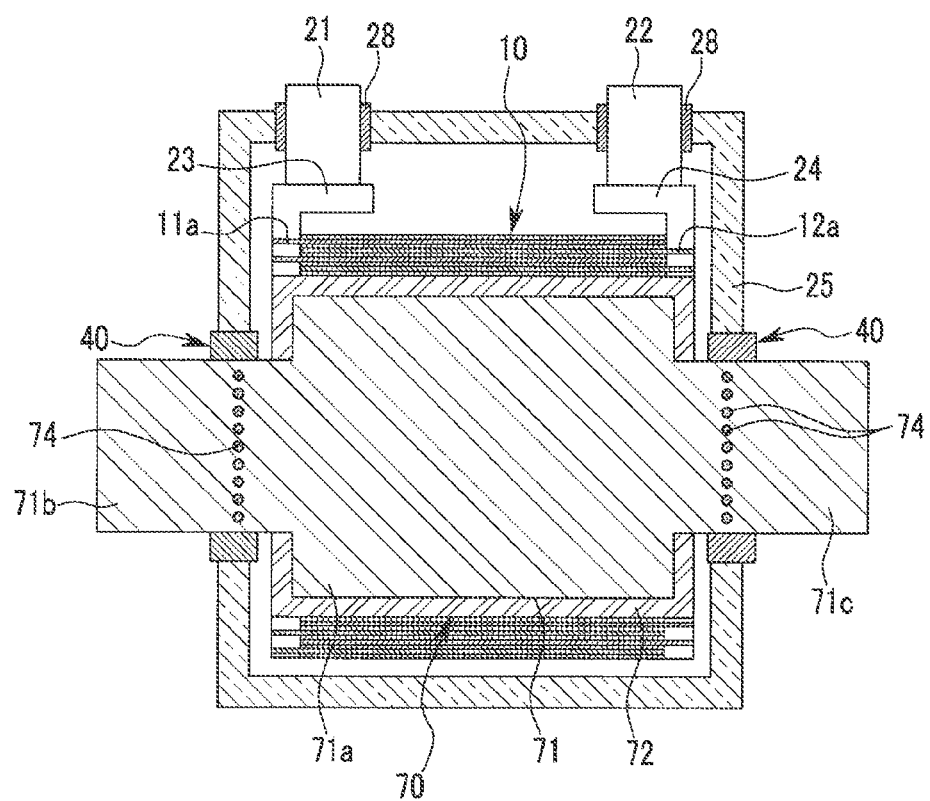
FIG. 9 is a cross-sectional view of a rechargeable battery according to another exemplary embodiment of the present invention.

FIG. 9 is a cross-sectional view of a rechargeable battery according to another exemplary embodiment of the present invention. Referring to FIG. 9, a rechargeable battery 105 according to an exemplary embodiment is formed having a same or similar structure to that of the rechargeable battery 101 described above, except for the structure of a heat dissipating member 70, and therefore a detailed description of the other same or similar components thereof will be omitted.

The heat dissipating member 70 according to one exemplary embodiment is inserted into the electrode assembly 10, and includes a metal plate 71 and an interception layer 72 that encloses the metal plate 71. The electrode assembly 10 is formed by winding in a state where a separator is interposed between a positive electrode and a negative electrode, as described above with respect to the electrode assembly 10 of the rechargeable battery 101. The metal plate 71 includes a heat collecting portion 71a that is positioned within the case 25 and is formed having an approximately quadrangular plate structure, and heat dissipating portions 71b and 71c that are protruded from the heat collecting portion 71a and exposed to the outside of the case 25.

The heat dissipating member 70, in one embodiment, has the first heat dissipating portion 71b and the second heat dissipating portion 71c that is protruded in a direction opposite to a protruding direction of the first heat dissipating portion 71b. In one embodiment, the first and second heat dissipating portions 71b and 71c are protruded to surfaces in which the terminals 21 and 22 are not installed in the case 25, and the first and second heat dissipating portions 71b and 71c are protruded to surfaces intersecting a surface in which the terminals 21 and 22 are installed.

Further, sealing members 40 that seal between the heat dissipating portions 71b and 71c and the case 25 are installed at regions in which the heat dissipating portions 71b and 71c and the case 25 are overlapped. The sealing members 40 according to one exemplary embodiment are formed having a same or similar structure as that of the sealing member 40 described above with respect to the rechargeable battery 101, and therefore a detailed description thereof will be omitted.

Further, in the heat dissipating portions 71b and 71c, a plurality of holes 74 are formed in a portion contacting the sealing member 40, and the sealing member 40 is inserted into the holes 74. The holes 74 are separated along a perimeter direction of the case 25, and the heat dissipating member 70 is stably fixed without moving by the sealing member 40. If the heat dissipating member 70 is moved by an external vibration or impact, the heat dissipating portions 71b and 71c may be separated from the sealing member 40 and a problem of an electrolyte solution leaking may occur. However, in the rechargeable battery 105, because the sealing member 40 is inserted into the holes 74 that are formed in the heat dissipating portions 71b and 71c, the sealing member 40 fixes the heat dissipating portions 71b and 71c and, thus, the sealing member 40 and the heat dissipating portions 71b and 71c are prevented or substantially prevented from being separated by an external impact or vibration.

In the rechargeable battery 105, because the two heat dissipating portions 71b and 71c are formed in the heat dissipating member 70, heat that is absorbed in the heat collecting portion 71a is more easily emitted and thus heat dissipating performance is further improved.

Figure 10:
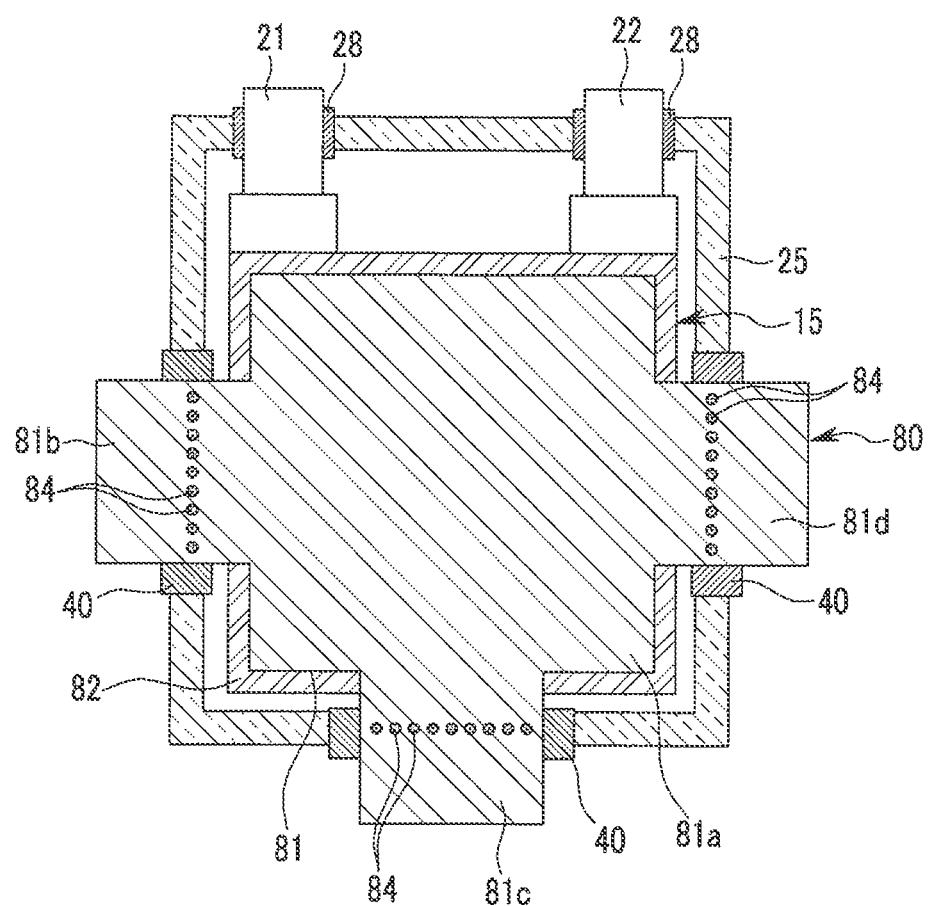
FIG. 10 is a cross-sectional view of a rechargeable battery according to another exemplary embodiment of the present invention.

FIG. 10 is a cross-sectional view of a rechargeable battery according to another exemplary embodiment of the present invention. Referring to FIG. 10, a rechargeable battery 106 according to an exemplary embodiment is formed having a similar structure to that of the rechargeable battery 101 described above, and therefore a detailed description of the same or similar components thereof will be omitted.

The rechargeable battery 106 includes an electrode assembly 15 and a heat dissipating member 80 that is inserted into the electrode assembly 15. The heat dissipating member 80 includes a metal plate 81 and an interception layer 82 that encloses the metal plate 81. The electrode assembly 15, in one embodiment, is a stack-type electrode assembly in which a plurality of positive electrodes and a plurality of negative electrodes are stacked with separators interposed therebetween. In one embodiment, the metal plate 81 includes a heat collecting portion 81a that is positioned within the case 25 and that is formed having an approximately quadrangular plate structure, and first, second, and third heat dissipating portions 81b, 81c, and 81d that are protruded from the heat collecting portion 81a and exposed to the outside of the case 25.

The heat dissipating member 80, according to one embodiment, has the first heat dissipating portion 81b, the second heat dissipating portion 81c that is protruded in a direction opposite to a protruding direction of the first heat dissipating portion 81b, and the third heat dissipating portion 81d that is protruded in a direction intersecting a protruding direction of the first heat dissipating portion 81b and the second heat dissipating portion 81c.

The heat dissipating portions 81b, 81c, and 81d, in one embodiment, are protruded from a surface in which the terminals 21 and 22 are not installed in the case 25. In one embodiment, the first heat dissipating portion 81b and the second heat dissipating portion 81c are protruded from a surface intersecting a surface in which the terminals 21 and 22 are installed, and the third heat dissipating portion 81d is protruded from a surface opposite a surface in which the terminals 21 and 22 are installed.

Further, sealing members 40 that seal between the case 25 and the heat dissipating portions 81b, 81c, and 81d are formed at regions in which the heat dissipating portions 81b, 81c, and 81d and the case 25 are overlapped. The sealing members 40 according to an exemplary embodiment are formed having the same structure (i.e. having the polymer layers) as described above with respect to the rechargeable battery 101, and therefore a detailed description thereof will be omitted.

Further, in one embodiment, in the heat dissipating portions 81b, 81c, and 81d, a plurality of holes 84 are formed in one or more portions contacting the sealing members 40, and the sealing members 40 are inserted into the holes 84. The holes 84 are separated along a perimeter direction of the case 25, and the heat dissipating member 80 is stably fixed without moving by the sealing member 40.

In the rechargeable battery 106, the three heat dissipating portions 81b, 81c, and 81d are formed in the heat dissipating member 80 for easily emitting heat that is absorbed in the heat collecting portion 81a, and heat dissipating performance is thereby improved.

Figure 11:
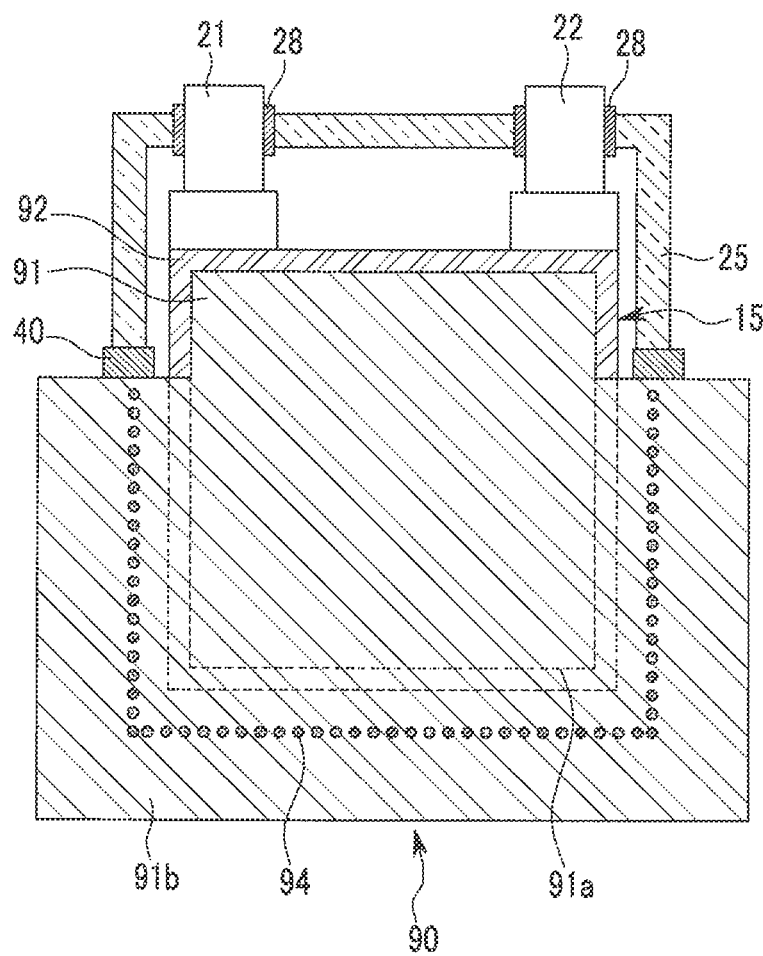
FIG. 11 is a cross-sectional view of a rechargeable battery according to another exemplary embodiment of the present invention.

FIG. 11 is a cross-sectional view of a rechargeable battery according to another exemplary embodiment of the present invention. Referring to FIG. 11, a rechargeable battery 107 according to an exemplary embodiment is formed having the same structure as the rechargeable battery 106 described above, except for a structure of a heat dissipating member 90, and therefore a detailed description of the same or similar components thereof will be omitted.

The heat dissipating member 90 according to one exemplary embodiment includes a metal plate 91 and an interception layer 92 that is inserted into an electrode assembly 15 of the rechargeable battery 107 and that encloses the metal plate 91. The electrode assembly 15, in one embodiment, is a stacked electrode assembly in which a plurality of positive electrodes and a plurality of negative electrodes are stacked with separators interposed therebetween. The metal plate 91 includes a heat collecting portion 91a that is positioned within the case 25 and that is formed having an approximately quadrangular plate structure, and a heat dissipating portion 91b that is protruded from the heat collecting portion 91a and exposed to the outside of the case 25.

The heat dissipating portion 91b, in one embodiment, is protruded from a surface in which the terminals 21 and 22 are not installed in the case 25, and the terminals 21 and 22 are protruded to one side of the case 25, and the heat dissipating portion 91b is protruded to three other sides of the case 25. The heat dissipating portion 91b is connected and protruded along three sides of the heat collecting portion 91a and is protruded from an entire first side surface of the heat collecting portion 91a that is opposite a side of the case 25 from which the terminal 21 and 22 protrude, and is protruded from portions of two side surfaces adjacent, or orthogonal, to the first side surface. Accordingly, the heat dissipating portion 91b is formed having a generally U-shaped form.

Further, a sealing member 40 that seals between the case 25 and the heat dissipating portion 91b is formed in a region in which the heat dissipating portion 91b and the case 25 are overlapped. The sealing member 40, according to an exemplary embodiment, is formed having the same structure as that of the sealing member 40 described above with respect to the rechargeable battery 101, and therefore a detailed description thereof will be omitted.

Further, in one embodiment, in the heat dissipating portion 91b, a plurality of holes 94 are formed in a portion contacting the sealing member 40, and the sealing member 40 is inserted into the holes 94. The holes 94 are separated along a perimeter direction of the case 25 and, thus, the heat dissipating member 90 is stably fixed without moving by the sealing member 40.

In the rechargeable battery 107, the heat dissipating portion 91b that is formed in the heat dissipating member 90 is connected and protruded to three side surfaces, and heat that is absorbed in the heat collecting portion 91a is easily emitted and, thus, heat dissipating performance is improved.

While this disclosure has been described in connection with what are presently considered to be some exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising a positive electrode, a negative electrode, and a separator between the positive electrode and the negative electrode;
a case housing the electrode assembly;
a heat dissipating member comprising a heat collecting portion inserted in the electrode assembly and a heat dissipating portion protruding outside of the case; and
a sealing member between the heat dissipating member and the case, the sealing member comprising a first polymer layer and a second polymer layer having a melting point that is lower than a melting point of the first polymer layer.

2. The rechargeable battery of claim 1, wherein the electrode assembly has a spiral-wound structure, and the heat dissipating member is inserted in a center of the electrode assembly.

3. The rechargeable battery of claim 1, wherein the heat dissipating member has a hole formed in a portion contacting the sealing member.

4. The rechargeable battery of claim 3, wherein a portion of the sealing member is in the hole.

5. The rechargeable battery of claim 1, wherein the second polymer layer comprises polypropylene.

6. The rechargeable battery of claim 1, wherein the second polymer layer comprises a first sealing layer comprising polypropylene and a second sealing layer comprising cast polypropylene.

7. The rechargeable battery of claim 1, wherein the first polymer layer and the second polymer layer are stacked.

8. The rechargeable battery of claim 1, wherein the sealing member further comprises a third polymer layer having a melting point that is lower than the melting point of the first polymer layer, and the first polymer layer is between the second polymer layer and the third polymer layer.

9. The rechargeable battery of claim 8, wherein the third polymer layer comprises a third sealing layer comprising polypropylene and a fourth sealing layer comprising cast polypropylene.

10. The rechargeable battery of claim 9, wherein the fourth sealing layer is between the third sealing layer and the first polymer layer.

11. The rechargeable battery of claim 1, wherein the first polymer layer comprises an imide-based resin.

12. The rechargeable battery of claim 1, wherein the first polymer layer comprises a material selected from the group consisting of polyimide, polyamideimide, polyetherimide, and polybismaleimide.

13. The rechargeable battery of claim 1, wherein the melting point of the first polymer layer is at least 20° C. higher than the melting point of the second polymer layer.

14. The rechargeable battery of claim 1, wherein the sealing member is hot pressed.

15. The rechargeable battery of claim 1, wherein the heat dissipating member comprises a metal plate.

16. The rechargeable battery of claim 1, wherein the heat dissipating member further comprises an interception layer covering a surface of the heat collecting portion.

17. The rechargeable battery of claim 1, further comprising a terminal protruding outside of the case in a first direction, wherein the heat dissipating portion is protruding outside of the case in a different direction than the first direction.

18. The rechargeable battery of claim 1, wherein the heat dissipating portion is a first heat dissipating portion, and the heat dissipating member further comprises a second heat dissipating portion protruding outside of the case in a direction opposite a direction in which the first heat dissipating portion is protruding outside of the case.

19. The rechargeable battery of claim 18, wherein the heat dissipating member further comprises a third heat dissipating portion protruding outside of the case in a direction intersecting the directions in which the first and second heat dissipating portions are protruding outside of the case.

20. The rechargeable battery of claim 1, wherein the heat dissipating portion is connected to and protruding outside of the case along three surfaces of the case.

* * * * *